Aug. 20, 1940.  R. PYZEL  2,212,043
APPARATUS FOR REFINING OR CATALYTIC TREATMENT
Filed Dec. 31, 1938
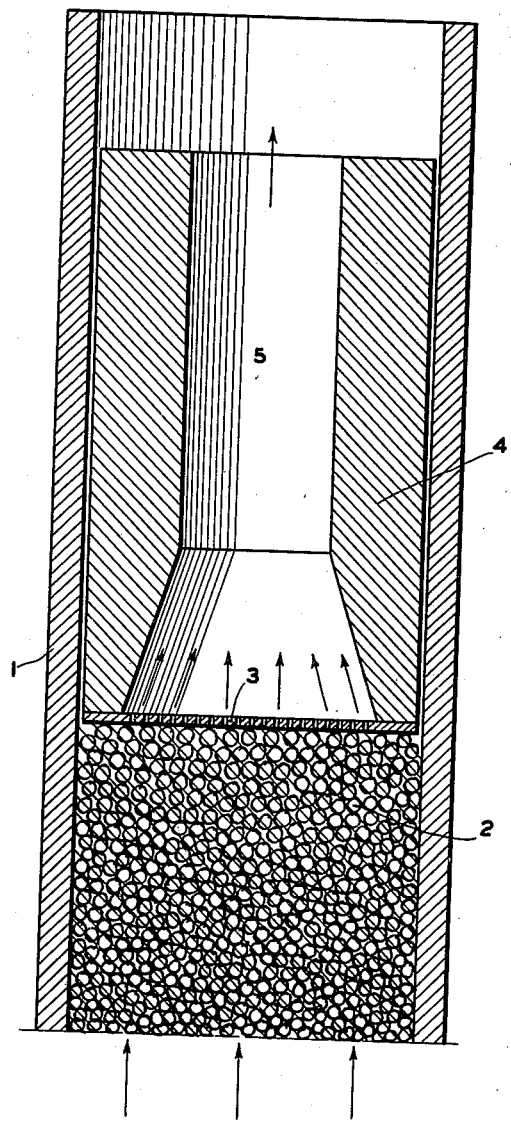
INVENTOR
ROBERT PYZEL
BY *Lee Gary*
ATTORNEY Patented Aug. 20, 1940

2,212,043

UNITED STATES PATENT OFFICE 2,212,043

APPARATUS FOR REFINING OR CATALYTIC TREATMENT

Robert Pyzel, Chicago, Ill., assignor to Universal Oil Products Company, Chicago, Ill., a corporation of Delaware Application December 31, 1938, Serial No. 248,833

2 Claims. (Cl. 183—47)

The invention is particularly concerned with improvements in apparatus of the class of filter chambers, reactors and the like, such as commonly employed for the refining treatment or catalytic conversion of hydrocarbons, and more specifically relates to means for preventing shattering or pulverization of the particles composing a bed of treating or catalytically active material when the flow of vaporous or gaseous materials undergoing treatment therein is upward through said bed.

In processes employing a bed of solid granular material, through which hydrocarbon vapors or gases or mixtures of the same are passed to accomplish their catalytic conversion or refining treatment, it is often advantageous to pass the materials undergoing treatment upwardly through said bed. Difficulty is often encountered in such processes due to the tendency of the stream of materials passing through the bed to blow the upper layers of particles, composing said bed, from the chamber, particularly when the bed is composed of relatively light or fine particles or contains substantial quantities thereof.

It has been attempted to solve the aforementioned difficulty by attaching a fixed screen to the walls of the chamber above the bed of catalytic or treating material. I have found that this is apt to aggravate rather than improve the situation. In one particular instance where this was tried, a single catalyst tube was filled with catalyst granules to such a height that the upper screen bore firmly against the catalyst bed. At the conclusion of a test run with upward flow through the catalyst bed, it was found upon opening the tube that practically all of the catalyst bed had disappeared. I attribute this to the fact that the catalyst bed settles and leaves a space between the top of the same and the screen. With upward flow through the catalyst bed, the upper catalyst particles are blown about and by repeated striking against the screen and the walls of the vessel they are eventually shattered and reduced to such a size that they are blown through the screen and out of the tube. This leaves a larger space between the top of the catalyst bed and the screen, which increases the difficulty so that, after a relatively short period of operation, substantially the entire catalyst bed is blown through the screen and out of the tube. It is also possible that with some catalysts or other granular-treating materials, the bed would expand rather than settle due to an increase in temperature when the hot vaporous or gaseous materials to be treated are passed therethrough or due to the lifting action of the stream. In such cases, initial pulverization is due to pressing of the catalyst particles against the fixed screen. However, in either case, the eventual result is the same.

To overcome the difficulties above mentioned, the present invention provides a weighted floating screen above the bed in the tube or chamber which will follow either expansion or contraction of the bed and keep the screen firmly pressed against the top of the bed, leaving substantially no space therebetween in which the particles may be blown about and shattered.

Preferably, before placing the weighted sliding screen, the top of the bed is leveled up so that the screen will bear firmly against the latter over substantially its entire area and the screen is, of course, of somewhat finer mesh than the particles composing the bed. The screen and weight are of sufficiently smaller size than the interior girth of the chamber in which they are used that they will slide freely without binding against the walls of the latter and will follow expansion and/or contraction of the bed. The weight may be of any desired form which will permit passage of the vapors and/or gases which have undergone treatment in the bed from the tube or chamber and may be integral with the screen attached thereto or may simply rest thereon. The term "screen" as employed in this specification and appended claims should be interpreted broadly to designate any perforate member or members which will permit passage of the vapors and gases but retain the particles composing said bed.

The accompanying drawing is a diagrammatic illustration of one specific form of apparatus embodying the features of the invention. It shows, in vertical section, the upper portion of a tubular element containing a bed of catalyst particles or other granular treating material with a weighted screen disposed thereabove. It will, of course, be understood that many modifications of the specific form of apparatus illustrated may be devised by any skilled mechanic in view of what I have here explained and is therefore not intended to limit the invention to the particular form of apparatus illustrated.

Referring to the drawing, the upper end of the tubular element containing a bed of granular solid material is indicated at 1. The granular solid material, which may be catalyst particles, fuller's earth, diatomaceous earth or any other material through which it is desired to pass a stream of hydrocarbon vapors or gases for treatment, is indicated at 2. A perforate member such as a screen or grating indicated at 3, with perforations sufficiently small to retain the particles of bed 2, is disposed above the bed and held against its upper surface by a weight 4 which, in the particular case here illustrated, is a substantially cylindrical member.

Weight 4 is of such size and shape that it can move freely up and down for at least a substantial distance corresponding to any contraction or expansion of bed 2. The screen 3 is also loosely fitted within the tubular member 1 so that it may move freely with bed 2 and the weight thereabove is sufficient to keep the screen firmly pressed against the upper surface of bed 2. The flow of vapors and/or gases through the tubular element 1 is in a general upward direction as indicated by the arrows and the treated vapors and/or gases pass through the perforations in the screen and through the hollow central portion 5 of weight 4 from the tube to the subsequent portions of the equipment not pertinent to the invention.

I claim as my invention:

1. In combination with a vertically elongated receptacle adapted to retain a bed of granular solid material through which vaporous materials are adapted to pass in a general upward direction, a perforate member slidable within the receptacle and disposed upon the upper surface of said bed, and a weight mounted on and slidable with said perforate member to keep the latter firmly pressed against the upper surface of the bed, said weight being apertured to permit the passage of said vaporous materials from the receptacle.

2. In combination with an elongated cylindrical receptacle adapted to receive a bed of granular solid material through which vaporous materials may pass in a general upward direction, a circular perforate member of smaller internal diameter than said receptacle, disposed therein and adapted to rest upon the upper surface of said bed, the perforations of said member being of such size as to permit the passage of said vapors and retain the granular particles of said bed, and a substantially cylindrical weight of smaller diameter than the internal diameter of said receptacle disposed upon said member and adapted to hold the latter in contact with the upper surface of the bed, said weight being centrally apertured to permit the passage of said vaporous materials therethrough.

ROBERT PYZEL.